United States Patent [19]

Toriyama

[11] Patent Number: 5,024,478
[45] Date of Patent: * Jun. 18, 1991

[54] BOX BLANK HOLDING DEVICE IN A BOX-MAKING MACHINE

[75] Inventor: Daigoro Toriyama, Chiba, Japan

[73] Assignee: Tanabe Machinery Co., Ltd., Tokyo, Japan

[*] Notice: The portion of the term of this patent subsequent to Jun. 5, 2007 has been disclaimed.

[21] Appl. No.: 485,082

[22] Filed: Feb. 23, 1990

Related U.S. Application Data

[63] Continuation-in-part of Ser. No. 309,346, Feb. 10, 1989, Pat. No. 4,930,830.

[51] Int. Cl.⁵ .............................................. B66C 1/42
[52] U.S. Cl. .................................. 294/88; 294/119.1; 901/37
[58] Field of Search ................ 294/88, 119.1; 901/31, 901/36, 37, 39; 269/227, 157

[56] References Cited

U.S. PATENT DOCUMENTS

| | | | |
|---|---|---|---|
| 2,390,293 | 12/1945 | Colson | 294/119.1 X |
| 4,377,305 | 3/1983 | Horvath | 901/31 X |
| 4,591,198 | 5/1986 | Monforte | 901/39 X |
| 4,632,631 | 12/1986 | Dunlap | 901/31 X |
| 4,648,646 | 3/1987 | Klüpfel et al. | 294/119.1 X |
| 4,707,013 | 11/1987 | Vranish et al. | 294/119.1 |
| 4,799,724 | 1/1989 | Rekers | 294/119.1 X |
| 4,930,830 | 6/1990 | Toriyama | 294/88 |

FOREIGN PATENT DOCUMENTS

| | | |
|---|---|---|
| 6603660 | 4/1969 | Fed. Rep. of Germany . |
| 2437475 | 2/1977 | Fed. Rep. of Germany . |
| 3115925 | 12/1982 | Fed. Rep. of Germany . |
| 3808799 | 9/1988 | Fed. Rep. of Germany . |
| 3735486 | 2/1989 | Fed. Rep. of Germany . |

Primary Examiner—Margaret A. Focarino
Assistant Examiner—Dean J. Kramer
Attorney, Agent, or Firm—Wenderoth, Lind & Ponack

[57] ABSTRACT

A box blank holding device for a box-making machine has a main body, a driving rack and a motor mechanism for reciprocally moving the driving rack relative to the main body. A transmission shaft is rotatably supported on the main body, the transmission shaft having a pair of pinions, and one of the pinions being in meshing engagement with the driving rack. A pair of holding-member actuating racks are disposed in meshing engagement with the other pinion. Each of the holding-member actuating racks has a holding member pivotally mounted thereto on an end thereof. Each of the holding members also has a roller thereon. The rollers are guided in respective guide grooves provided on the main body for guiding the holding members between projecting and retracted positions for holding and releasing a stack of box blanks. By using a fluid cylinder as the motor mechanism, the holding force on a stack of box blanks can be predetermined.

8 Claims, 6 Drawing Sheets

BOX BLANK HOLDING DEVICE IN A BOX-MAKING MACHINE

This is a continuation-in-part of U.S. patent application Ser. No. 07/309,346 now U.S. Pat. No. 4,930,830.

BACKGROUND OF THE INVENTION

The present invention relates to a box blank holding device in a box-making machine, which device holds blanks while moving them to a predetermined position and, more specifically, to a device of this kind that is capable of securely holding box blanks, already folded by the machine, regardless of the thickness and the hardness or softness of the blanks.

Conventionally, a box blank holding device in a box-making machine has a pair of holding members projecting from a main body adapted to, for example, be moved toward and away from each other by a gear mechanism so that the blanks are released when the holding members are moved away from each other. A means for moving the holding members toward and away from each other is adapted to, for example, move the pair of holding members close to each other until they are positioned so as to be separated by a predetermined width in accordance with the thickness of the blanks to be held, which blanks which may arranged in a stack.

However, in an arrangement wherein the pair of holding members project from the main body, they present obstacles to the feeding of blanks that are already folded by the box-making machine to the stacking section of the machine, particularly when the holding members are adapted to hold opposite sides of the blanks. If the space between the pair of holding members is increased in order to overcome this inconvenience, however, the stroke of the holding members during their movement toward each other is correspondingly increased. Such an increase is not desirable from a practical point of view, because it leads to a reduction in the working efficiency. In addition, because such an increase requires an increase in the length of the main body, the blank stacking section becomes large, and hence the entire machine may become undesirably long and large.

Furthermore, in an arrangement wherein the pair of holding members are moved toward each other by a gear mechanism so as to be separated by a predetermined width, if, for instance, the total thickness of the stacks of folded blanks varies among the stacks, the result will be that a stack having a total thickness greater than the predetermined width will be held under a higher pressure, whereas a stack having a total thickness less than the predetermined width will be held with a low pressure. Thus there is a risk that the blanks in a stack may be damaged or that they may not be held securely. In order to avoid such a risk it is necessary to adjust the space between the holding members for each stack, thereby adding operational inconvenience.

To solve the above-described problems, the present inventor proposed in Japanese Utility Model Laid-Open No. 43024/1989, corresponding to the U.S. parent application No. 07/309,346, a box blank holding device in a box-making machine, which device is capable of securely holding box blanks regardless of the thickness and the hardness or softness of the box blanks. As illustrated in FIGS. 7 and 8 of this application, this proposed blank holding device comprises a main body 1, a driving rack 3 movable by a supply of air to and a discharge of air from a cylinder 2, a transmission shaft 6 rotatably supported by the main body 1 and having a pair of pinions 4 and 5, one of the pinions 4 and 5 being in meshing engagement with the driving rack 3, a pair of holding member-actuating racks 7 and 8 disposed on opposite sides of the other pinion 5 of the transmission shaft 6 in meshing engagement with that pinion, retracting and projecting guide plates 9 mounted on the holder main body 1, and a pair of holding members 10 and 11 pivotally mounted on the ends of the holding member actuating racks 7 and 8 in such a manner as to be retractable and projectable while facing each other and being guided by the guide plates 9.

The above proposal succeeded in solving the problems of the conventional arrangement, and was provided with a specific form of means for projecting and retracting the pair of holding members. Such means is arranged as shown in FIGS. 7 and 8. Rollers 12 are disposed on the rear sides of the pair of holding members 10 and 11, respectively, and springs 15 or resilient members such as leaf springs are held between the shafts 13 of the rotors 12 and the mounting shafts 14 of the holding members 10 and 11 associated with the holding-member actuating racks 7 and 8. The resilient forces of the springs 15 always urge the corresponding holding members 10 and 11 in a direction in which the holding members are retracted (in the directions opposite the arrows in FIG. 7). When the holding-member actuating racks 7 and 8 are moved toward the transmission shaft 6 (in the directions of the corresponding arrows) along the projecting-and-retracting guide plates 9, the respective rotors 12 are raised while moving along the guide plates 9 of L-shaped cross section, thereby causing the holding members 10 and 11 to project inwardly. In this arrangement, each time a stack of box blanks is inverted, the holding members 10 and 11 must be projected and retracted at high speeds. This arrangement may lead to new kinds of problems: for example, the springs may be damaged or broken due to elastic fatigue or similar problems, causing an imperfect operation and reducing the overall service life of the device.

SUMMARY OF THE INVENTION

It is an object of the present invention to provide a box blank holding device in a box making machine solving the above-described problems, providing a reliably operating box blank holding device which is superior in durability.

To achieve the above objects of the present invention, there is accordingly provided a box blank holding device in a box-making machine which provides a main body, a driving rack, and motor means for reciprocally moving the driving rack relative to the main body. A transmission shaft is rotatably supported on the main body, the transmission shaft having a pair of pinions. One of the pinions is in meshing engagement with the driving rack. A pair of holding-member actuating racks are disposed in meshing engagement with the other pinion. Each of the holding-member actuating racks has a holding member pivotally mounted on an end thereof, whereby the holding members are movable with the holding-member actuating racks, the holding-member actuating racks being moved by the motor means reciprocally moving the driving rack to turn the one pinion, thus turning the other pinion and moving the holding-member actuating racks. A means is provided for causing the holding members to move between a projecting position and a retracted position. Preferably, the means comprises projecting and retracting guide grooves on the main body and rollers on the holding members for engagement with the guide grooves.

Preferably, the means for causing comprises a pair of guide plates that are connected to the main body, each of the guide plates defining one of the guide grooves.

In a further preferred feature, the guide grooves extend along a front face of the main body for guiding the holding members therealong in the projecting position. The guide grooves further turn substantially 90° at respective ends of the main body for guiding the holding members to the retracted position. The holding members are substantially flush with the front face of the main body in the retracted position.

The motor means preferably comprises a fluid cylinder mounted to the rear of the main body. Guide rails are mounted on the rear face of the main body, the fluid cylinder being mounted to the guide rails for reciprocal movement therealong. The driving rack is then connected to the fluid cylinder so that the driving rack is reciprocally movable with the fluid cylinder.

Furthermore, each of the holding members comprises a flat holding portion and a base portion extending substantially perpendicularly thereto. The base portion has a pivot connection adjacent to the flat holding portion for pivotally mounting the holding member to its respective holding-member actuating rack. A shaft is also positioned on the base portion adjacent the pivot connection for mounting the roller which engages the respective guide groove.

With the above arrangement, the holding members are guided between their respective projecting and retracting positions without the necessity of a spring or spring-like member undergoing repeated flexure. Thus there is provided a box-holding device in a box-making machine which will always operate reliably and which is superior in durability due to the elimination of the possibility of elastic fatigue or similar problems of a spring or spring-like member.

Furthermore, the above and other objects of the present invention will become more apparent from the following detailed description of a specific embodiment of the present invention, taken in conjunction with the accompanying drawings.

BRIEF DESCRIPTION OF THE DRAWINGS

The drawings illustrate an embodiment of a box blank holding device in a box-making machine in accordance with the present invention, in which.

DESCRIPTION OF THE PREFERRED EMBODIMENT

An embodiment of the present invention will now be described hereinbelow with reference to the accompanying drawings. In this embodiment, a box blank holding device in accordance with the present invention is used in a box blank inverting apparatus of a box-making machine.

Figure 1:
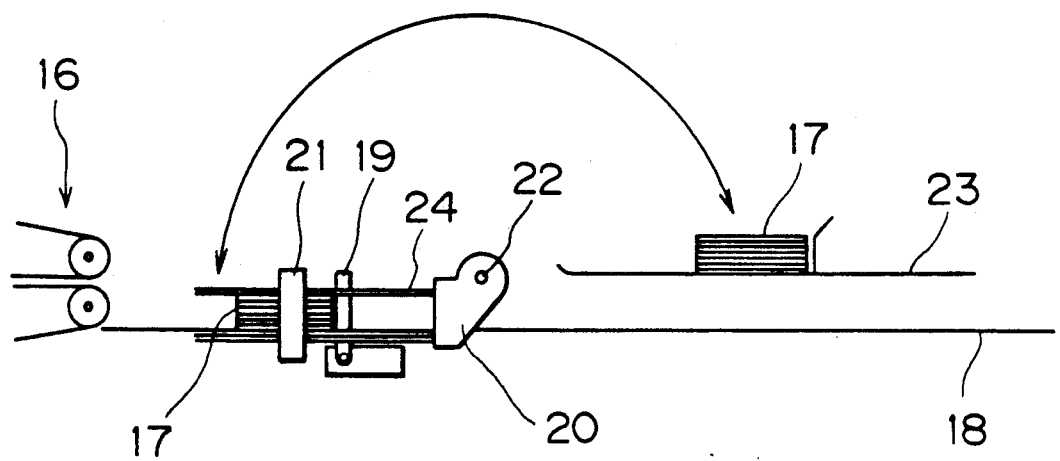
FIG. 1 is a schematic side view of an inverting mechanism of a box blank apparatus incorporating a box blank holding device according to the present invention.
Figure 2:
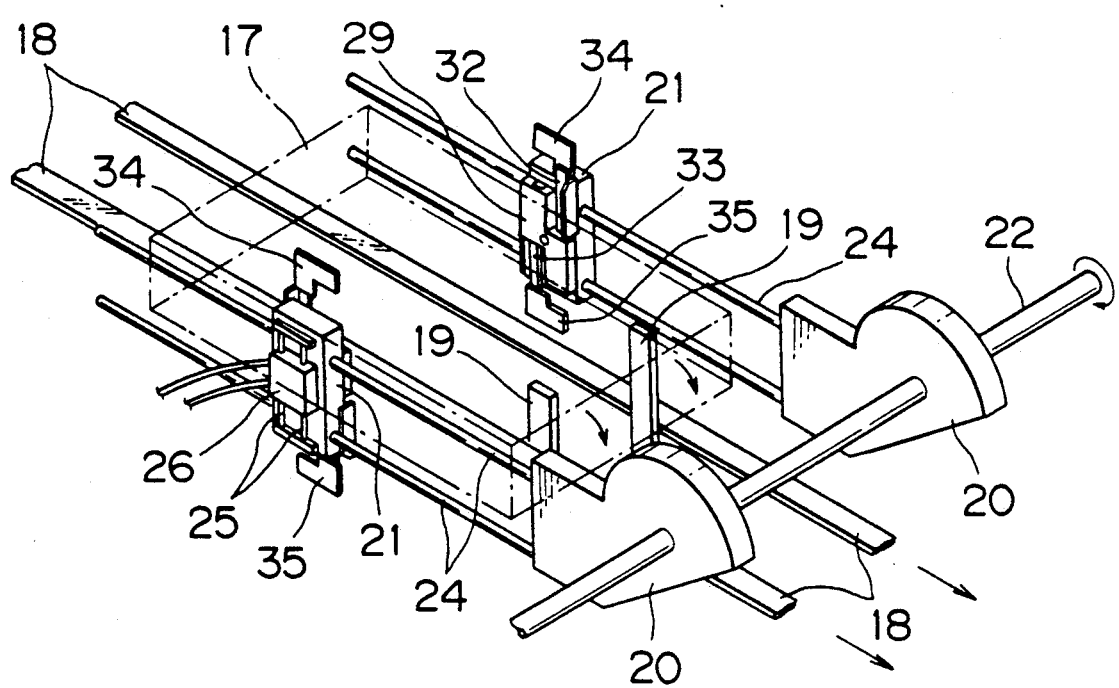
FIG. 2 is a perspective view, on an enlarged scale, of a portion of the box blank holding device of FIG. 1.

FIGS. 1 and 2 both illustrate portions of an inverting mechanism of a box blank inverting apparatus. Folded boxes 17 are fed one by one from a folded box blank feeding apparatus 16 (only part of which is shown on the left side of FIG. 1) to the position of a stopper 19 provided on first rails 18.

When folded blanks 17 have been fed to form a stack of a predetermined number of box blanks, the opposite sides of the stack of folded box blanks 17 are engaged and held by a pair of holders 21 provided on respective inverters 20. The inverters 20 are then rotated about a shaft 22 in order to invert the stack of folded box blanks 17 and place the stack on second rails 23.

Figure 3:
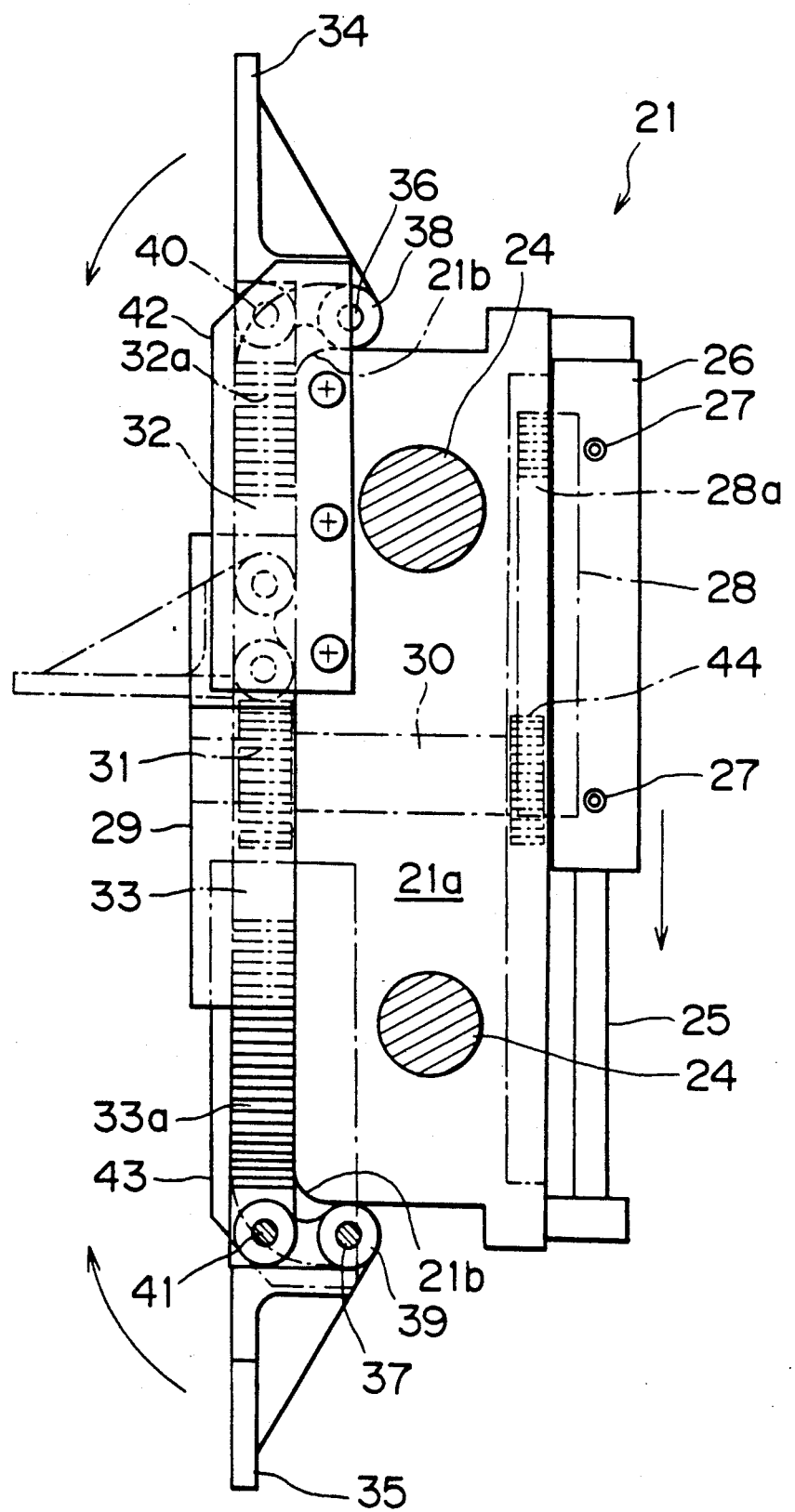
FIG. 3 is a schematic side view of a holder of the box blank holding device illustrated in FIG. 2.
Figure 4:
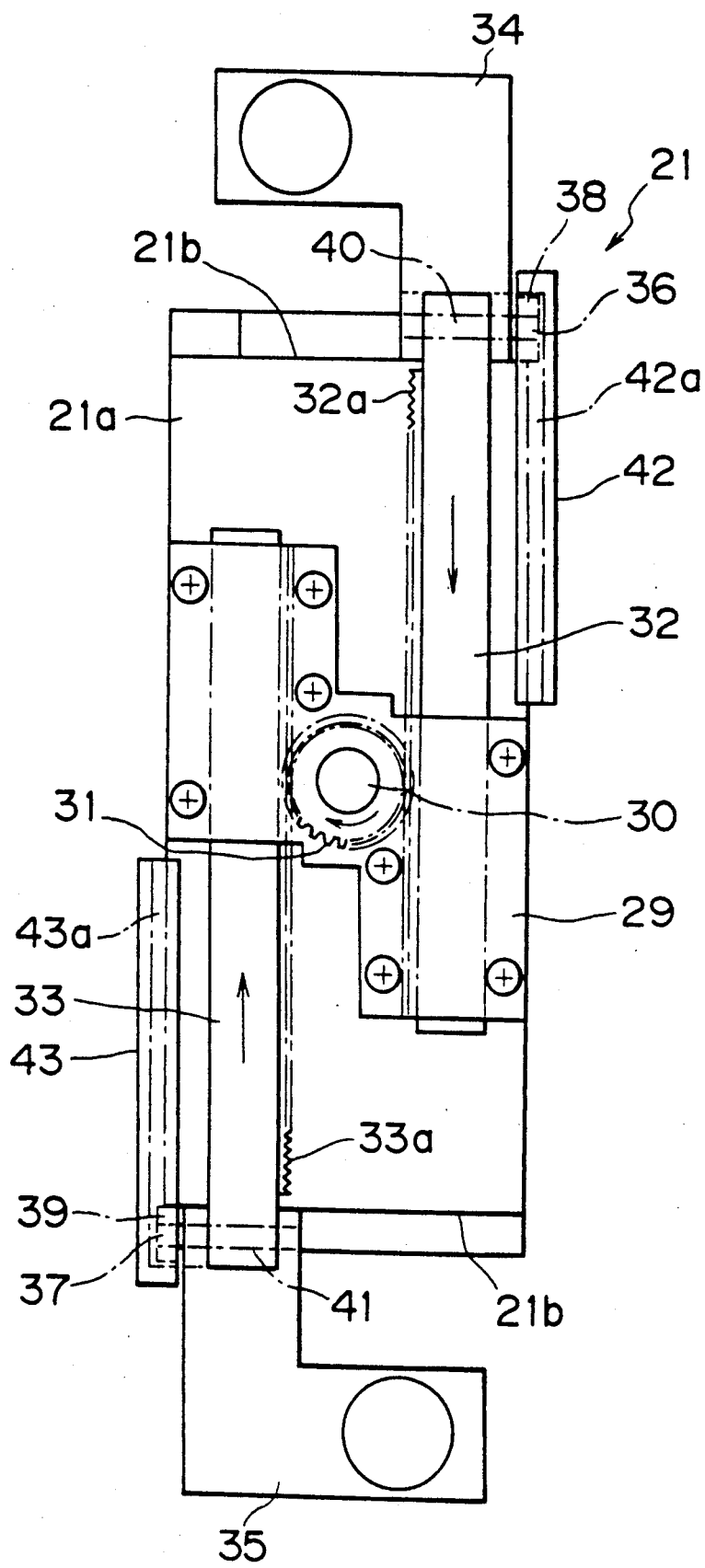
FIG. 4 is a schematic front elevational view of the holder of FIG. 3.
Figure 5:
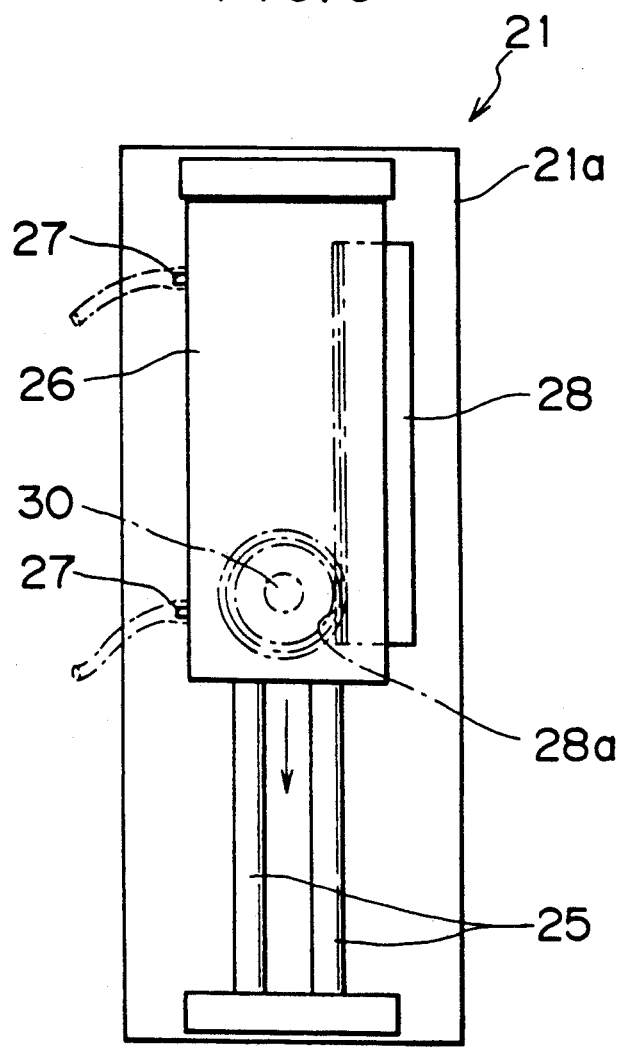
FIG. 5 is a schematic rear elevational view of the holder of FIGS. 3 and 4.

After the stack of folded blanks 17 has been placed on the second rails 23, the holders 21 release the stack of folded box blanks 17, and the inverters 20 are rotated backward to return to their initial position. A pair of bars 24 extend from each inverter 20. Each pair of bars 24 mount one of the holders 21. The construction of the holders 21 is illustrated in FIGS. 3-5.

Holder 21 has a main body portion 21a. The main body portion 21a is mounted on the bars 24 of the inverters 20. A pair of holding members 34 and 35 are adapted to be guided along the outer face of the main body portion 21a between a position as seen in solid lines in FIG. 3, the retracted position, and a position as seen in broken lines in FIG. 3, the projecting position. The holding members 34 and 35 are movable together between these respective positions such that they can together clamp a stack of box blanks 17.

In order to move the holding members 34 and 35 between their respective positions, it is necessary to provide a motor mechanism for the purpose of moving the holding members. In a preferred form of the present invention, a pair of vertically extending guide rails 25 may be fixedly mounted on an outer face of the main body 21a. A fluid cylinder 26, preferably an air cylinder, is mounted with respect to each pair of guide rails 25 and has a pair of fluid ports 27 such that the cylinder 26 will be vertically movable by the supply and discharge of fluid through the supply and discharge ports 27.

A transmission mechanism is also preferably provided in order to transmit the motion of the fluid cylinder 26 to the respective holding members 34 and 35. In the preferred form of the present invention, a driving rack member 28 is mounted on one side of the fluid cylinder 26, the rack member 28 having a rack 28a. Thus movement of the fluid cylinder 26 will cause movement of the rack 28a.

In order to transmit motion of the rack 28a, a transmission shaft 30 is rotatably mounted in the main body 21a, preferably near the center thereof, as seen in FIG. 3. The transmission shaft 30 extends from the outer or rear side of the holder 21 (the right side of FIG. 3) toward the inner or front side thereof (the left side of FIG. 3). The transmission shaft extends to and through a mounting piece 29 mounted on the inner side of the holder 21.

A pinion 44 is secured to an end of the transmission shaft 30 at the outer side of the main body 21a. The pinion 44 is disposed so as to mesh with the rack 28a of the driving rack member 28.

On the front or inner side of the holder 21, a pinion 31 is securely fitted onto the other end portion of the transmission shaft 30. A pair of holding-member actuating rack members 32 and 33 are disposed, respectively, on opposite sides of the pinion 31 in a parallel spaced relationship, as seen in FIG. 4. The holding-member actuating rack members 32 and 33 have racks 32a and 33a thereon, respectively, racks 32a and 33a being maintained in meshing engagement with the pinion 31. The holding-member actuating rack members 32 and 33 are held and guided on the holder main body 21a by means of the mounting piece 29. The mounting piece 29 holds the holding-member actuating rack members 32 and 33 such that each of the members 32 and 33 can be moved along the front or inner side of the main body 21a of the holder 21. On the end of the holding-member actuating rack members 32 and 33 is mounted a respective box blank holding member 34 and 35.

The present invention further includes a mechanism for guiding the holding members 34 and 35 between their projecting and retracted positions. As can be seen from FIGS. 3-5, the upper and lower ends of the inner or front side of the main body 21a have guide portions 21b for guiding the holding members between their respective projecting and retracting positions. Each of the guide portions 21b has an arced corner and one surface which extends normal to the plane of the outer side of the holder 21.

The holding members 34 and 35 of the present invention preferably have the following arrangement. Each holding member has a holding portion for actually contacting and holding box blanks, and a base portion for pivotally mounting and guiding the holding member. Specifically, the base portions of the holding members 34 and 35 have respective mounting shafts 40 and 41 for pivotally mounting the holding members to their respective holding-member actuating rack member. The pivotal mounting enables the holding members to be moved between their projecting and retracted positions. Furthermore, the base portions of the holding members 34 and 35 further include rollers 38 and 39 rotatably disposed thereon at the rear portion thereof by respective shafts 36 and 37. These rollers are used to guide the holding members 34 and 35.

In a preferred feature of the present invention, guide plates 42 and 43 are fixed to the opposite ends of the holder main body 21a so as to define respective guide grooves 42a and 43a. The rollers 38 and 39 of the holding members 34 and 35 are inserted into and guided by their respective corresponding guide groove 42a or 43a such that they can travel back and forth along the guide portions 21b.

The operation of the box blank holding device according to the present invention having the above-described construction and arrangement will now be explained.

FIGS. 2-4 each show the state of the holding members 34 and 35 being retracted, i.e. the holding-member actuating rack members 32 and 33 have been shifted to their upper most and lower most positions, respectively. In this state, if fluid, preferably air, is supplied to the fluid cylinder 26 through one of the fluid supply and discharge ports 27 and discharged through the other port, the fluid cylinder 26 will move downward, as seen in the figures. This action rotates the pinion 44 with the movement of the rack 28a of the driving rack member 28 mounted on the fluid cylinder 26. This rotation is transmitted through the transmission shaft 30 to cause the other pinion 31 to rotate. The rotation of the other pinion 31 moves the holding-member actuating rack members 32 and 33, which have their racks 32a and 33a meshed with the pinion 31. The holding-member actuating rack members 32 and 33 are then moved parallel to each other toward, generally, the transmission shaft 30, i.e., in the downward and upward directions, respectively, as viewed in the figures. At this time, as the rollers 38 and 39 of the holding members 34 and 35 travel along the guide portions 21b and the guide grooves 42a and 43a of the guide plates 42 and 43, respectively, the corresponding holding members 34 and 35, provided on the ends of the holding-member actuating rack members 32 and 33, are rotated about their respective mounting shafts 40 and 41 to project into the projecting position shown by phantom lines in FIG. 3. In this way the holding members 34 and 35 are caused to hold a stack of folded box blanks 17 therebetween with a predetermined pressure determined by the fluid cylinder 26.

Figure 6:
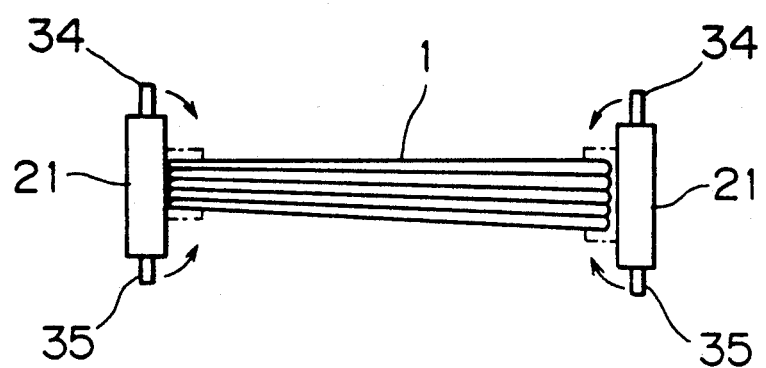
FIG. 6 is a schematic view illustrating a state wherein box blanks are held by the box blank holding device according to the present invention.
Figure 7:
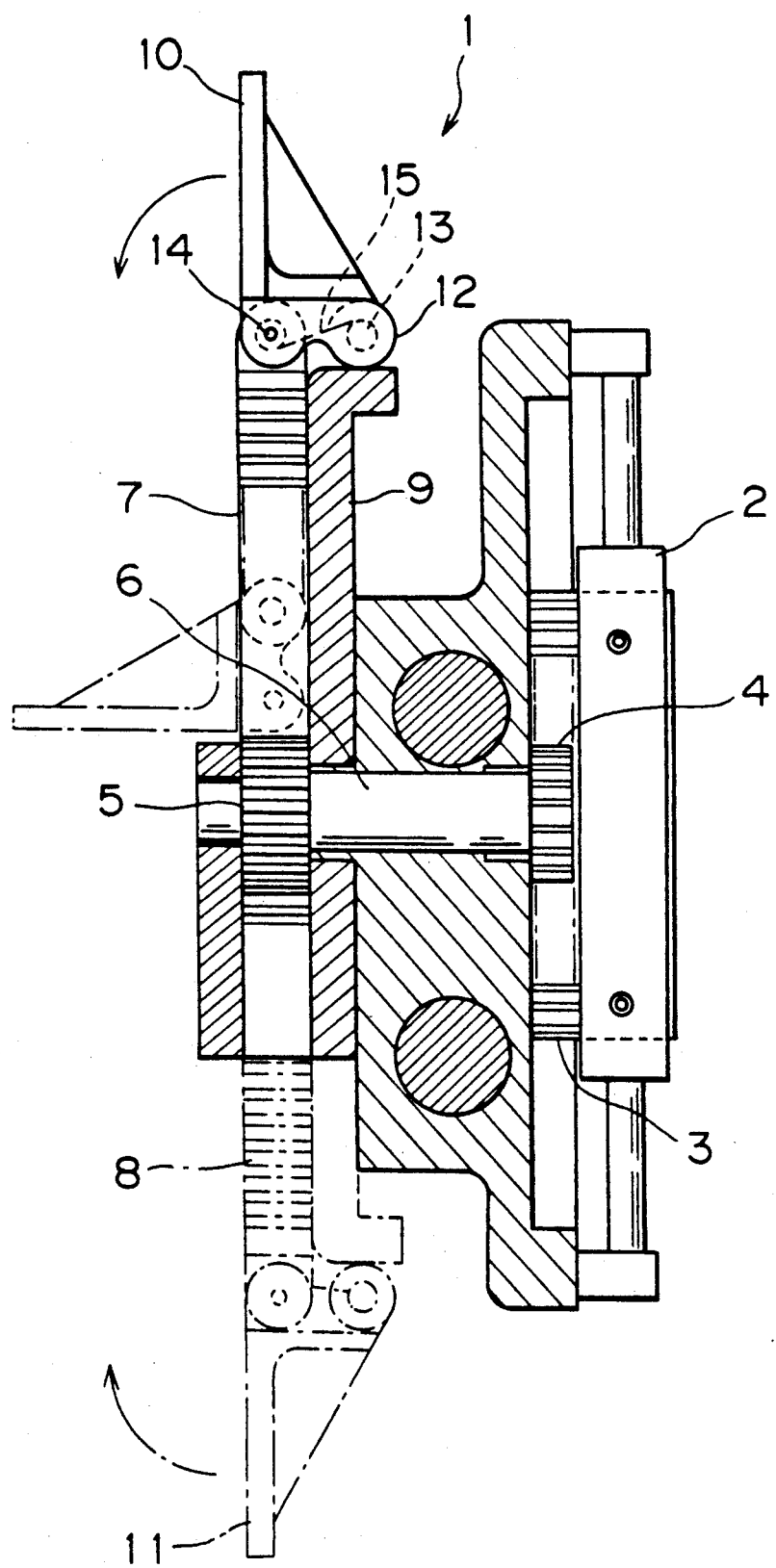
FIG. 7 is a sectional elevational view of a holder according to the parent application.
Figure 8:
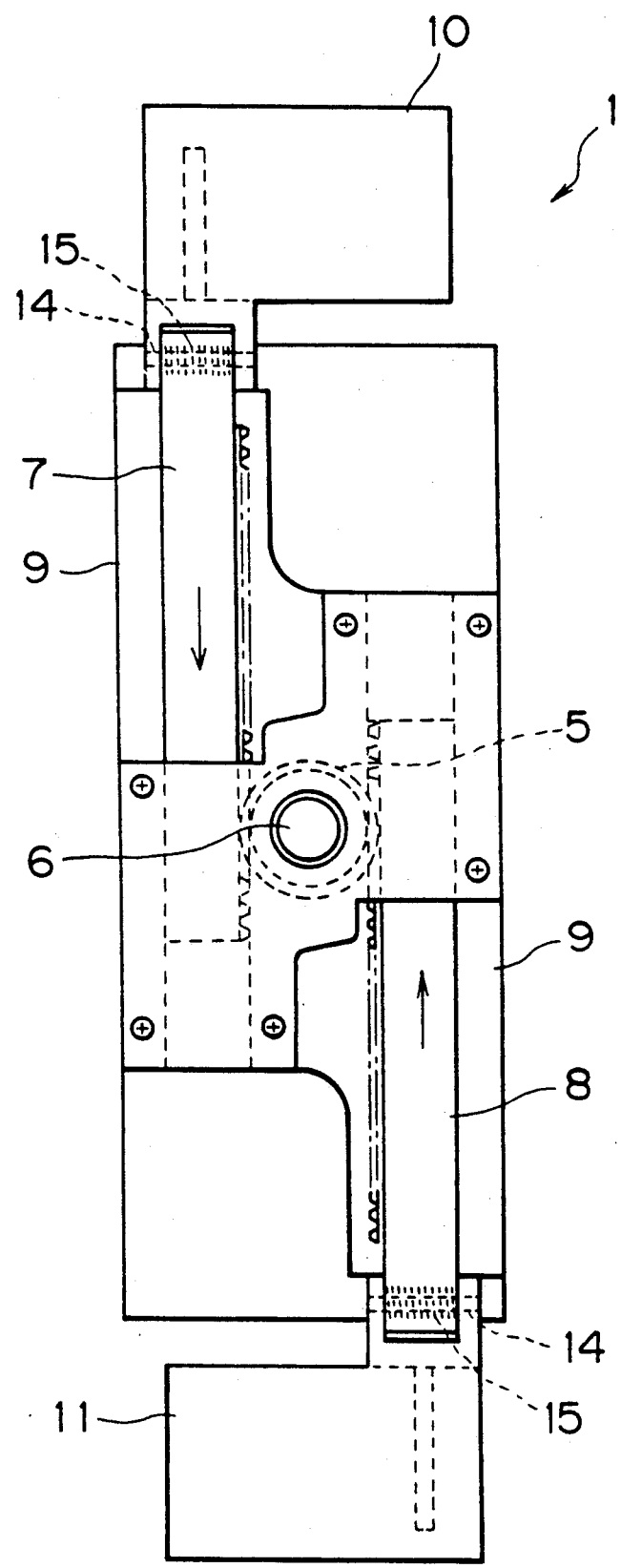
FIG. 8 is a front elevational view of the holder of FIG. 7.

As a result, even when the thickness of a stack of folded box blanks 17 differs between the opposite sides of the stack, as for example seen in FIG. 6, there will be no difference between the holding pressure applied to the respective opposite sides of the stack. A difference will occur only between the amounts of movement of the holding-member actuating rack members 32 and 33.

When it is required or desired to release the stack of folded box blanks 17 from their held condition, fluid is supplied to the fluid cylinder 26 through the other of the ports 27 and discharged through the first port, causing the fluid cylinder 26 to move upward as viewed in the figures. The holding-member actuating rack members 32 and 33 are then moved oppositely to their above-described movement, i.e., parallel to each other upward and downward, respectively, away from the transmission shaft 30.

When the ends of the holding-member actuating rack members 32 and 33 have moved to positions beyond their corresponding guide portions 21b, the rollers 38 and 39 of the respective holding members 34 and 35 are moved along the guide portions 21b toward the outer side of the main body 21a by means of the guide grooves 42a and 43a, respectively. The holding members 34 and 35 are thereby made flush with the respective holding-member actuating rack members 32 and 33, and the folded box blanks 17 are released from the holding members 34 and 35.

In the box blank holding apparatus in a box-making machine according to the present invention, it is possible to securely hold box blanks with a predetermined pressure even when there is a difference in the thickness or the hardness of the box blanks. In addition, the holders are arranged to be projected and retracted by the cooperation of the guide grooves formed on the holder main body and the rotors provided on the rear sides of the respective holders. Accordingly, the present apparatus the advantages of improved durability and of preventing accidents or failures due to the rapid motion of the holders or the like.

Although the embodiment of the present invention of the holding device has the above-described construction and operation, this construction and operation is merely exemplary, and the construction and operation of the device is not limited the examples described above. For example, an arrangement such as those described below may be adopted.

The fluid cylinder may be an air cylinder, as discussed above, or it may be a hydraulic cylinder.

The number of holders used may be varied, depending on the type of application.

Each of the fluid cylinders may be fixed to the main body of the holder, and the rack may be formed on a movable rod of the cylinder.

It should clearly understood that various other changes and modifications may be made without departing from the spirit and scope of the present invention.

I claim:

1. A box blank holding device for a box-making machine, comprising:
   a main body;
   a driving rack;
   motor means for reciprocally moving said driving rack relative to said main body;
   a transmission shaft rotatably supported on said main body, said transmission shaft having a pair of pinions, one of said pinions being in meshing engagement with said driving rack;
   a pair of holding-member actuating racks disposed in meshing engagement with the other said pinion;
   each said holding-member actuating rack having a holding member pivotally mounted on an end thereof, whereby said holding members are movable with said holding-member actuating racks, said holding-member actuating racks being moved by said motor means reciprocally moving said driving rack to turn said one of said pinions, thus turning said other of said pinions and moving said holding-member actuating racks; and
   means for causing said holding members to move between a projecting position and a retracted position, said means comprising projecting and retracting guide grooves on said main body and rollers on said holding members for engagement with said guide grooves.

2. The box blank device as set forth in claim 1, wherein:
   said means for causing comprises a pair of guide plates connected to said main body, each said guide plate defining a said guide groove.

3. The box blank holding device as set forth in claim 1, wherein:
   said guide grooves extend along a front face of said main body for guiding said holding members therealong in said projecting position, and turn substantially 90° at respective ends of said main body for guiding said holding members to said retracted position.

4. The box blank holding device as set forth in claim 3, wherein:
   said holding members are substantially flush with said front face in said retracted position.

5. The box blank holding device as set forth in claim 1, wherein:
   guide rails are mounted on a rear face of said main body;
   said motor means is a fluid cylinder mounted to said guide rails for reciprocal movement therealong; and
   said driving rack is connected to said fluid cylinder.

6. The box blank holding device as set forth in claim 1, wherein:
   each said holding member comprises a flat holding portion and a base portion extending substantially perpendicularly thereto, said base portion having a pivot connection adjacent said flat holding portion for pivotally mounting said holding member to its respective said holding-member actuating rack and a shaft mounting a said roller for engagement with said guide groove.

7. A box blank holding device for a box-making machine, comprising:
   a main body;
   a driving rack;
   motor means for reciprocally moving said driving rack relative to said main body;
   a transmission shaft rotatably supported on said main body, said transmission shaft having a pair of pinions, one of said pinions being in meshing engagement with said driving rack;
   a pair of holding-member actuating racks disposed in meshing engagement with the other said pinion;
   each said holding-member actuating rack having a holding member pivotally mounted on an end thereof, whereby said holding members are movable with said holding-member actuating racks, said holding-member actuating racks being moved by said motor means reciprocally moving said driving rack to turn said one of said pinions, thus turning said other of said pinions and moving said holding-member actuating racks; and
   means for pivotally moving said holding members between a projecting engagement position and a retracted position in response to movement of said holding-member actuating racks by said motor means.

8. The box blank holding device as set forth in claim 7, wherein:
   said main body has a front face, along which said holding-member actuating racks move, and upper and lower ends; and
   said means for pivotally moving moves said holding members to their retracted position when said holding-member actuating racks move said holding members to said upper and lower ends of said main body.

* * * * *